F. MLADINICH.
MOTION PICTURE CAMERA.
APPLICATION FILED NOV. 24, 1920.

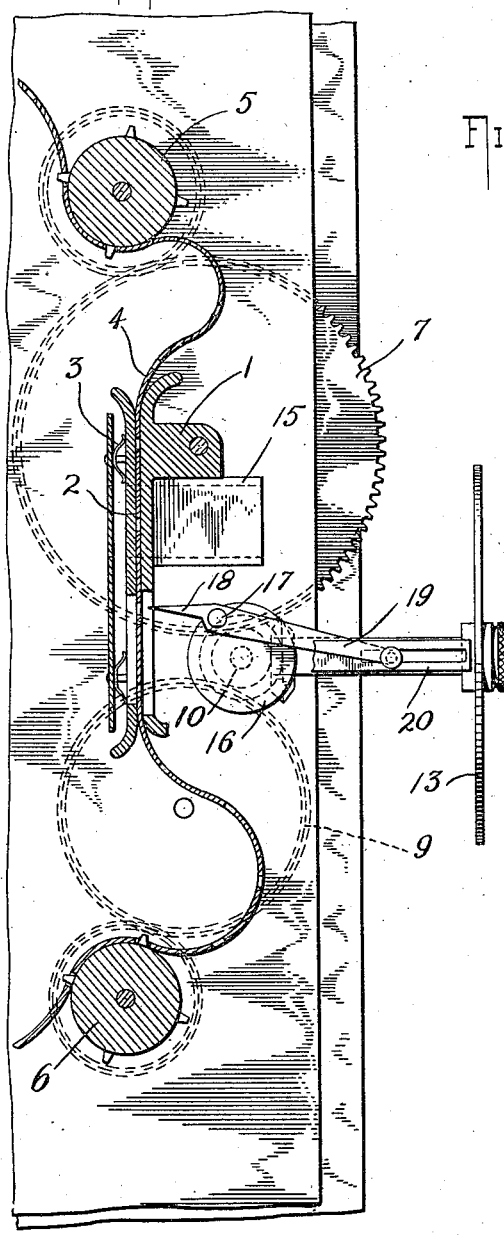
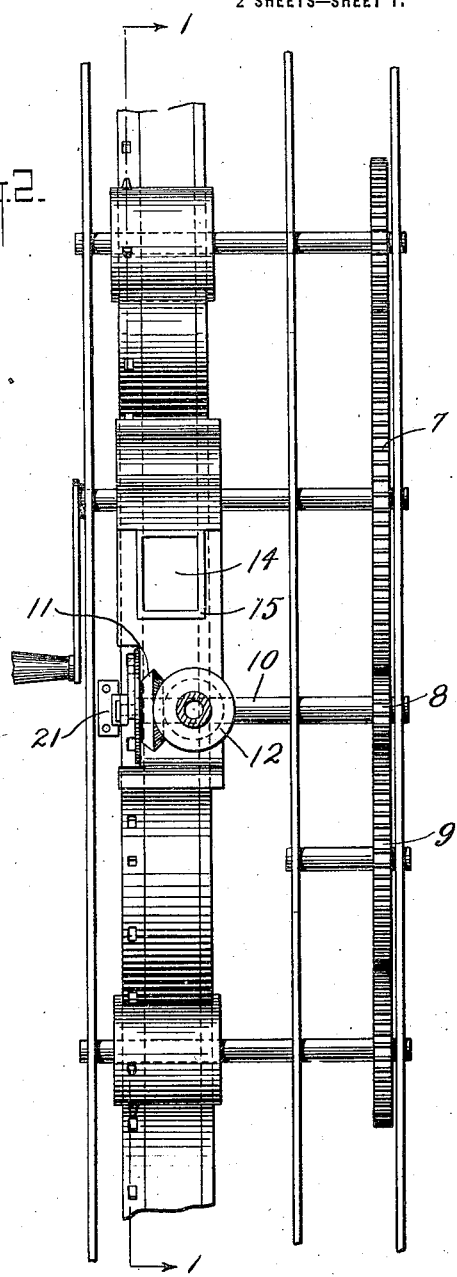

1,377,265.

Patented May 10, 1921.
2 SHEETS—SHEET 2.

Inventor
FRANK MLADINICH.
By his Attorneys

UNITED STATES PATENT OFFICE.

FRANK MLADINICH, OF NEW YORK, N. Y.

MOTION-PICTURE CAMERA.

1,377,265.                Specification of Letters Patent.        Patented May 10, 1921.

Application filed November 24, 1920. Serial No. 426,225.

*To all whom it may concern:*

Be it known that I, FRANK MLADINICH, a subject of Servia, residing at city of New York, Bronx county, State of New York, have invented a certain new and useful Improvement in Motion-Picture Cameras, of which the following is a full, clear, and exact description.

My invention relates to motion picture cameras and has for its object to provide a new and improved film feed for such cameras. It further has for its object to provide a feed in which the element engaging the film shall at the moment of first engagement have a substantially rectilineal movement at right angles to the film. It further has for its object to provide a feed which in its film disengaging movement has a substantially rectilineal movement at right angles to the film.

One feature of my invention consists in a finger mounted on a crank and pointing in a direction substantially at right angles to the film and means for maintaining the finger in that relation to the plane of the film as the crank revolves. Another feature consists in an arm connected to said finger and a guide for said arm to secure said result. Another feature of my invention consists in making said guide substantially parallel to the plane of the portion of the film engaged by said finger.

The following is a description of an embodiment of my invention, reference being had to the accompanying drawings, in which, Figure 1 shows one embodiment of my invention, the film guide being shown in section on the line 1—1, Fig. 2;

Fig. 2 is a front view of the apparatus shown in Fig. 1, with the shutter removed;

Figure 3:
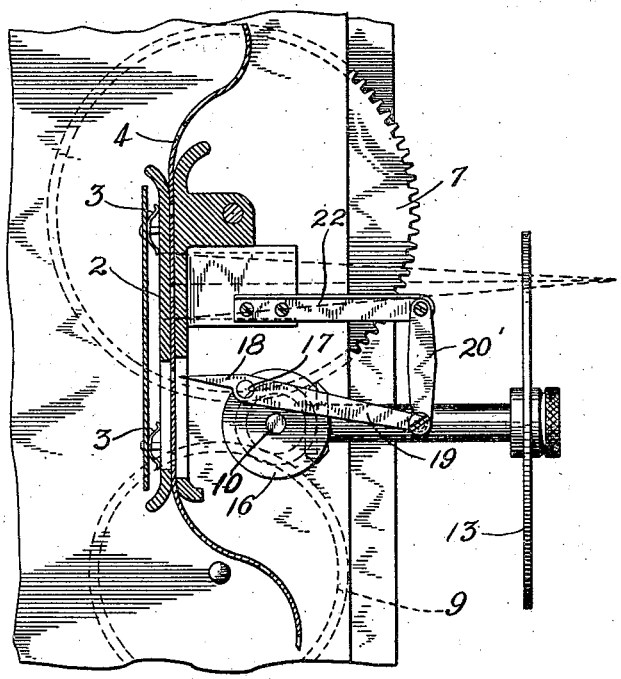
Fig. 3 is a modification showing a different means for controlling the finger.

Referring more particularly to the drawings, 1 is a film-guide having the usual pressure plate 2 held against it by springs 3, the film 4 being fed thereto by a sprocket wheel 5 and received therefrom upon a sprocket wheel 6, the sprockets entering perforations upon one side of the film. 7 is a driving gear which is geared to the sprocket 5 directly and is geared to the sprocket 6 through gears 8 and 9 (Fig. 2). The shaft 10 of the gear 8 carries a beveled gear 11, which engages a beveled gear 12, which actuates a shutter shown conventionally at 13, exposing a portion of the film behind the opening 14 in the tubular extension 15. The film guide is cut away both in front and to the rear of the perforations in the film in the ordinary manner.

In order to feed the film, I provide upon the shaft 10 a disk 16 having a crank pin 17, thus forming a crank upon which is pivoted a finger 18. This finger is provided with an arm 19 whose free end is guided by a slotted guide 20 mounted at 21 on the framework of the camera. In operating the feed, the disk 16 is caused to move counterclockwise (Fig. 1), with the result that the finger 18 is first caused to enter one of the perforations in the film 4. As the disk 16 is further revolved, the finger 18 moves downward, dragging the film with it. After the axis of the pin 17 has passed below the axis of the shaft 10, the finger 18 is withdrawn from the perforation by a substantially rectilineal movement at right angles to the plane of the film and finally entirely disengages the film after one step of the movement of the film has been fully completed. As the disk continues to revolve the finger is then moved upward and toward the film, reengaging another perforation in the film and repeats its feeding operation.

The finger 18 is tapered on both sides and therefore does not engage the film until a substantial portion of that finger has, in its forward movement, penetrated the film through one of said perforations and as it leaves the film it disengages the sides of said perforation before it has been completely withdrawn from the perforation. In this way a very positive step by step movement of the film is produced, with little rubbing action upon the film, enabling the apparatus to be operated at high speeds without danger of injury.

In the modification shown in Fig. 3 I employ, instead of a stationary guide, a link 20' pivoted to a supporting arm 22 and to the finger arm 19, whereby substantially the same movements of the finger 18 are produced.

Figure 4:
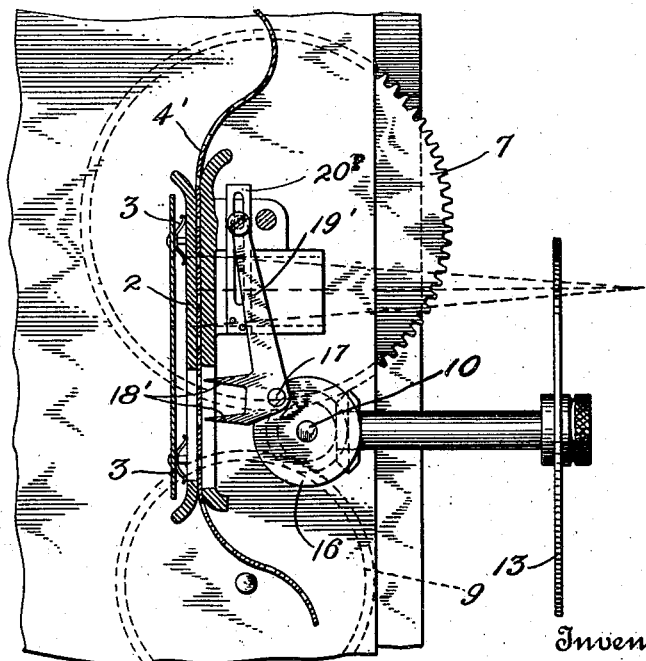
Fig. 4 is another modification showing another different means for controlling the position of the finger.

In the form shown in Fig. 4, I use two pointed fingers 18' mounted upon the pin 17 and an arm 19' connected thereto and extending upwardly therefrom and provide a vertical guide 20² secured to the frame of the machine and engaging the free end of the arm 19' and acting to determine the position of the fingers 18' relatively to the plane of the film 4', which has twice as many perforations as the film 4. In this arrangement also the action is similar to the action of the arrangement shown in Figs. 1 and 2 and produces substantially the same results.

In all cases the parts should be so proportioned that the finger begins to enter a perforation and finally leaves a perforation when the crank-pin is near the upper or lower portion of its stroke, the direction of the movement of the finger at those times being more nearly normal to the opposing portion of the film.

I prefer to use the sliding guides for positioning the film engaging fingers. Of the two sliding guides shown one is at right angles to the straight portion of the film and the other is at right angles to a plane normal thereto and to its longitulinal axis.

The film shown in the drawings is one-half of the width of a usual moving picture film, and when that is the case but one row of perforations is necessary in order to secure good results. My invention, however, is not confined to the use of half films having a single row of perforations, although it is very well adapted for use in connection therewith.

As will be evident to those skilled in the art, my invention permits of various modifications without departing from the spirit thereof or the scope of the appended claims.

What I claim is:

1. In a motion picture camera, the combination of a film guide, a perforated strip of film therein, a crank, a finger mounted on said crank, an arm extending from said finger, and a guide having a guiding surface engaging the end of said arm, said arm constituting a lever whose lever arm is of constant length.

2. In a motion picture camera, the combination of a film guide, a perforated strip of film therein, a crank, a finger mounted on said crank, an arm extending from said finger, and a guide having a guiding surface engaged by the end of said arm, said guiding surface being rectilineal, said arm constituting a lever whose lever arm is of constant length.

3. In a motion picture camera, the combination of a film guide having a rectilineal guiding surface perpendicular to one plane and at right angles to another plane normal to said first plane, a perforated strip of film therein, a crank, a finger mounted on said crank, a second guide having its guiding surface parallel to one of said planes, and an arm extending from said finger and having its end engaging said guiding surface so that said arm constitutes a lever whose lever arm is of constant length.

FRANK MLADINICH.